(12) United States Patent
Kim et al.

(10) Patent No.: US 11,467,299 B2
(45) Date of Patent: Oct. 11, 2022

(54) FULL WAVEFORM INVERSION VELOCITY GUIDED FIRST ARRIVAL PICKING

(71) Applicant: SAUDI ARABIAN OIL COMPANY, Dhahran (SA)

(72) Inventors: Young Seo Kim, Dhahran (SA); Adam J. Fox, Dhahran (SA); Krzysztof K. Sliz, Dhahran (SA); Tong W. Fei, Dhahran (SA); Jewoo Yoo, Delft (NL)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 68 days.

(21) Appl. No.: 17/123,533

(22) Filed: Dec. 16, 2020

(65) Prior Publication Data

US 2022/0187485 A1 Jun. 16, 2022

(51) Int. Cl.
*G01V 1/28* (2006.01)
*G01V 1/30* (2006.01)

(52) U.S. Cl.
CPC ........... *G01V 1/282* (2013.01); *G01V 1/305* (2013.01); *G01V 2210/6222* (2013.01); *G01V 2210/66* (2013.01)

(58) Field of Classification Search
USPC .......................................................... 702/18
See application file for complete search history.

(56) References Cited

U.S. PATENT DOCUMENTS

| | | |
|---|---|---|
| 2004/0243313 A1 | 12/2004 | Broto |
| 2011/0238390 A1 | 9/2011 | Krebs et al. |
| 2013/0261976 A1 | 10/2013 | Alshuhail et al. |
| 2013/0297273 A1 | 11/2013 | Altundas et al. |
| 2015/0241582 A1* | 8/2015 | Kahn .................. G01V 1/345 702/14 |
| 2016/0202371 A1 | 7/2016 | Li et al. |
| 2017/0068008 A1* | 3/2017 | Colombo .............. G01V 1/288 |
| 2017/0115411 A1* | 4/2017 | Zhang .................. G01V 1/282 |
| 2017/0176621 A1 | 6/2017 | Valero et al. |
| 2017/0242142 A1 | 8/2017 | Jiao et al. |
| 2018/0120464 A1 | 5/2018 | Sun et al. |

(Continued)

FOREIGN PATENT DOCUMENTS

| | | |
|---|---|---|
| CN | 106054244 A | 10/2016 |
| WO | 2013093467 A1 | 6/2013 |

OTHER PUBLICATIONS

Xu, Sheng et al., "3D angle gathers from reverse time migration", Geophysics, Society of Exploration Geophysicists, vol. 76, No. 2, Mar. 2011, pp. S77-S92 (16 pages).

(Continued)

*Primary Examiner* — Paul D Lee
(74) *Attorney, Agent, or Firm* — Osha Bergman Watanabe & Burton LLP

(57) ABSTRACT

A method of determining an arrival-time of a first seismic event in a seismic data set including, obtaining the seismic data set and an initial seismic velocity model, and determining an updated seismic velocity model based on the seismic data set. Furthermore, the method includes determining a simulated arrival-time of the first seismic event based on the updated seismic velocity model and defining a predicted time-window based on the simulated arrival-time of the first seismic event, and picking the arrival-time of the first seismic event in the seismic data set based on the predicted time-window.

20 Claims, 6 Drawing Sheets

(56) References Cited

U.S. PATENT DOCUMENTS

2019/0187312 A1   6/2019   Ramox-Martinez et al.
2019/0324167 A1   10/2019  Zhang
2020/0116883 A1   4/2020   Padhi et al.

OTHER PUBLICATIONS

Wong, Joe, "Automatic time-picking of first arrivals on large seismic datasets", CREWES Research Report, vol. 26, 2014, pp. 1-15 (15 pages).
Horn, Berthold K.P. and Brian G. Schunck, "Determining Optical Flow", Artificial Intelligence, North-Holland, vol. 17, 1981, pp. 185-203 (19 pages).
Boschetti, Fabio et al., "A fractal-based algorithm for detecting first arrivals on seismic traces", Geophysics, Society of Exploration Geophysicists, vol. 61, No. 4, Jul.-Aug. 1996, pp. 1095-1102 (8 pages).
Coppens, F., "First Arrivals Picking on Common-offset Trace Collections for Automatic Estimation of Static Corrections", Geophysical Prospecting, vol. 33, 1985, pp. 1212-1231 (20 pages).
Peraldi, R. and A. Clement, "Digital Processing of Refraction Data Study of First Arrivals", Geophysical Prospecting, vol. 20, 1972, pp. 529-548 (20 pages).
Sabbione, Juan I. and Danilo Velis, "Automatic first-breaks picking: New strategies and algorithms", Geophysics, Society of Exploration Geophyscists, vol. 75, No. 4, Jul.-Aug. 2010, pp. V67-V76 (10 pages).
International Search Report and Written Opinion issued in Application No. PCT/US2021/063860, dated Mar. 25, 2022 (14 pages).

\* cited by examiner

FULL WAVEFORM INVERSION VELOCITY GUIDED FIRST ARRIVAL PICKING

BACKGROUND

Seismic surveys are frequently conducted by participants in the oil and gas industry. Seismic surveys are conducted over subsurface regions of interest during the search for, and characterization of, hydrocarbon reservoirs. In seismic surveys, a seismic source generate seismic waves which propagate through the subterranean region of interest are and detected by seismic receivers. Typically, both seismic sources and seismic receivers are located on the earth's surface. The seismic receivers detect and store a time-series of samples of earth motion caused by the seismic waves. The collection of time-series of samples recorded at many receiver locations generated by a seismic source at many source locations constitutes a seismic data set.

To determine earth structure, including the presence of hydrocarbons, the seismic data set may be processed. Processing a seismic data set includes a sequence of steps designed to correct for near-surface effects, attenuate noise, compensate of irregularities in the seismic survey geometry, calculate a seismic velocity model, image reflectors in the subsurface, calculate a plurality of seismic attributes to characterize the subterranean region of interest, and aid in decisions governing if, and where, to drill for hydrocarbons.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method of determining an arrival-time of a first seismic event in a seismic data set including, obtaining the seismic data set and an initial seismic velocity model, and determining an updated seismic velocity model based on the seismic data set. Furthermore, the method includes determining a simulated arrival-time of the first seismic event based on the updated seismic velocity model, defining a predicted time-window based on the simulated arrival-time of the first seismic event, and picking the arrival-time of the first seismic event in the seismic data set based on the predicted time-window.

In general, in one aspect, embodiments relate to a non-transitory computer readable medium storing instructions executable by a computer processor, the instructions including functionality for obtaining a seismic data set and an initial seismic velocity model, and determining an updated seismic velocity model based on the seismic data set. Furthermore, the instructions include functionality for determining a simulated arrival-time of the first seismic event based on the updated seismic velocity model, defining a predicted time-window based on the simulated arrival-time of the first seismic event, and picking the arrival-time of the first seismic event in the seismic data set based on the predicted time-window.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
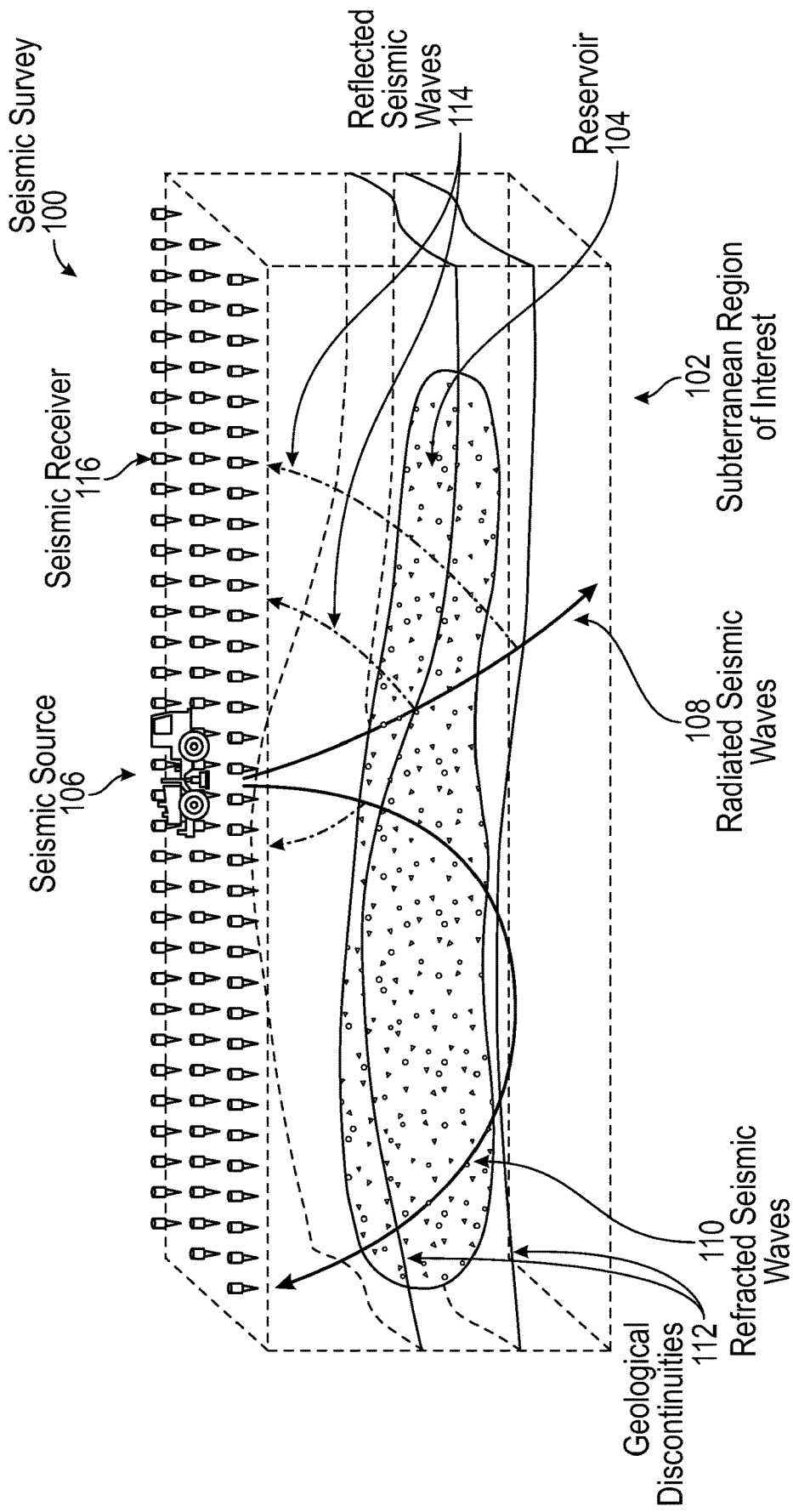
FIG. 1 depicts a seismic survey, in accordance with one or more embodiments.

FIG. 1 shows a seismic survey (100) of a subterranean region of interest (102), which may contain a reservoir (104). The seismic survey (100) may utilize a seismic source (106) that generates radiated seismic waves (108). The radiated seismic waves (108) may return to the surface as refracted seismic waves (110), or may be reflected by geological discontinuities (112) and return to the surface as reflected seismic waves (114). At the surface, the refracted seismic waves (110) and reflected seismic waves (114) may be detected by seismic receivers (116).

In some embodiments, the refracted seismic waves (110) and reflected seismic waves (114) generated by a single activation of the seismic source (106) are recorded by a seismic receiver (116) as a time-series representing the amplitude of ground-motion at a sequence of discreet times. This time-series may be denoted a seismic "trace". The seismic receivers (116) are positioned at a plurality of seismic receiver locations which we may denote $(x_r, y_r)$ where x and y represent orthogonal axes on the earth's surface above the subterranean region of interest (102). Thus, the refracted seismic waves (110) and reflected seismic waves (114) generated by a single activation of the seismic source (106) may be represented as a three-dimensional "3D" volume with axes $(x_r, y_r, t)$ where $(x_r, y_r)$ represents the location of the seismic receiver (116) and t delimits the time sample at which the amplitude of ground-motion was measured.

However, a seismic survey (100) may include recordings of seismic waves generated by a seismic source (106) that is positioned at a plurality of seismic source locations denoted ($x_s$, $y_s$). Thus, all the data acquired by a seismic survey (100) may be represented as a five-dimensional volume, with coordinate axes ($x_s$, $y_s$, $x_r$, $y_r$, t), and denoted a "seismic data set".

A seismic data set must be processed to generate a seismic velocity model of the subterranean region of interest (102), or an image seismic reflectors within the subterranean region of interest (102). Seismic reflectors may be of the geological boundaries, such as the boundaries between geological layers, the boundaries between different pore fluids, faults, fractures or groups of fractures within the rock.

Processing a seismic data set comprises a sequence of steps designed, without limitation, to correct for near surface effects, attenuate noise, compensate of irregularities in the seismic survey geometry, calculate a seismic velocity model, image reflectors in the subsurface, calculate a plurality of seismic attributes to characterize the subterranean region of interest (102), and aid in decisions governing where to drill for hydrocarbons.

Figure 2A:
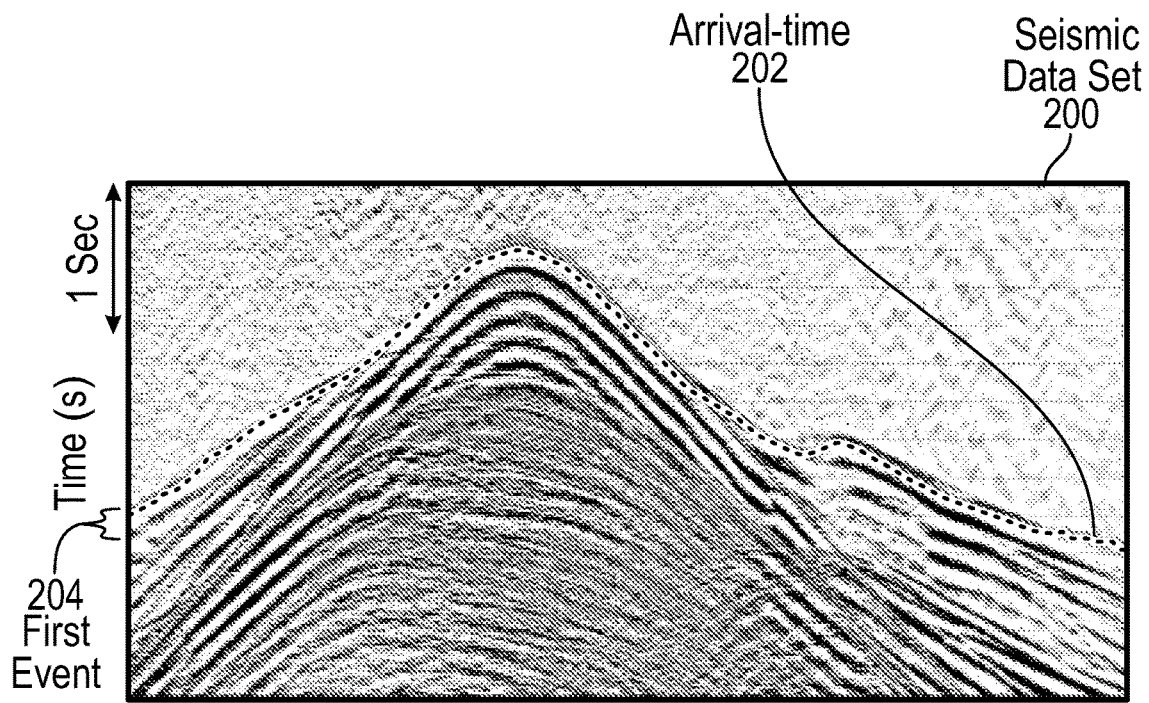
FIG. 2A, 2B show a seismic data set, in accordance with one or more embodiments.
Figure 2B:
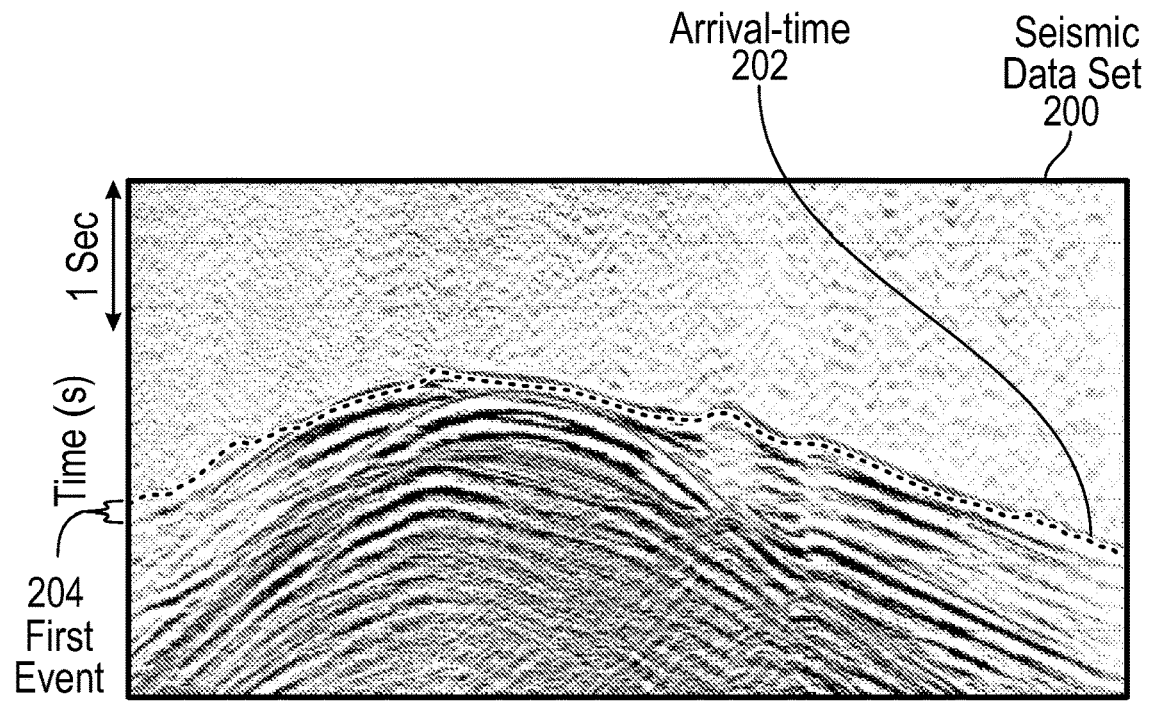

One of the steps which is typically employed early in the processing of a seismic data set (200) is to pick the arrival-time (202) of a first arriving event for each seismic trace. FIG. 2A and FIG. 2B show two-dimensional (2D) slices through a seismic data set (200). In both FIG. 2A and FIG. 2B the abscissa (horizontal axis) is one horizontal receiver position coordinate, e.g. $x_r$, and the ordinate (vertical axis) is time, t. FIG. 2A shows a 2D slice which passes close to the source position ($x_s$, $y_s$), while FIG. 2B shows a 2D slice which passes further from the source position ($x_s$, $y_s$). The picked arrival-time (202) of the first arriving event (204) for each seismic trace is shown in FIG. 2A and FIG. 2B by the solid line running generally from left to right across the plot. The difference in the geometry of the 2D slice with respect to the source position is reflected in the generally later arrival-times (202) of the first arriving event (204) in FIG. 2B compared to FIG. 2A.

The arrival-time (202) of the first event (204) may be used to estimate and compensate for "statics correction" which include, without limitation, localized changes in the elevation of the ground surface on which the seismic survey is collected, and localized changes of the seismic velocity close to the surface. In addition, the arrival-time (202) of the first event (204) may be used in steps later in the seismic data set (200) processing, such as in determining seismic velocity models.

Many methods of picking the arrival-time (202) of a first event (204) in a seismic data set (200) are familiar to one of ordinary skill in the art. For example, picking the arrival-time (202) of a first event (204) may be based upon variations in the statistical descriptions of the seismic trace. Alternatively, picking the arrival-time (202) of a first event (204) may be based upon variations in the energy ratio of time-windows of different length along the seismic trace. In addition, methods for picking the arrival-time (202) of a first event (204) based upon machine learning algorithms have been proposed.

In particular, in accordance with one or more embodiments, the arrival-time (202) of the first event (204) in a seismic data set (200) may be picked using the Modified Energy Ratio (MER) method, whereby an energy ratio, M, is computed for each seismic trace, as:

$$M(t) = \left\{ \left( \sum_{i=t}^{t+n_e} |s_i^2| \bigg/ \sum_{t=n_e}^{t} |s_i^2| \right) |s_i| \right\}^3 \quad \text{Equation (1)}$$

where t is a time index, $s_i$, is the amplitude of the seismic trace at the i-th time index and $n_e$ is the number of time samples in a moving time-window before and after the time t. The arrival-time (202) of the first event (204) for each trace is then identified as the time at which M attains its maximum value.

In accordance with one or more embodiments, the MER method may be applied to a real seismic data set (200) acquired over subterranean regions of interest to find the arrival-time (202) of the first event (204). If the signal-to-noise ratio (SNR) of the seismic traces are good, then any of the methods for picking arrival-times (202) familiar to one of ordinary skill in the art, may give a result of adequate accuracy. However, in seismic data sets (200) where at least some of the seismic traces have low SNR existing methods, including the MER method, when used alone may not give results of adequate accuracy.

In accordance with one or more embodiments a method if picking arrival-times (202) of a first event (204) in a seismic data set (200) may be combined with a method for estimating the arrival-time (202) of a first event (204) in a simulated seismic data set calculated for a seismic velocity model to yield a result of adequate accuracy.

The velocity of seismic wave propagation may vary with depth below the surface and may vary with horizontal spatial position within the subterranean region of interest (102). Seismic wave velocity may be determined from a seismic data set (200) acquired by a seismic survey above the subterranean region of interest (102). The determination of the seismic wave velocity may be achieved using a number of methods well known to one of ordinary skill in the art. For example, where seismic wave velocity is invariant with horizontal position, seismic normal moveout analysis may be appropriate. In cases where seismic wave velocity varies only slowly with horizontal position, iterative Kirchhoff migration, or iterative one-way wave propagation migration may be used. In cases where seismic wave velocity varies rapidly with horizontal position, tomographic or full waveform inversion are most appropriate.

Figure 3:
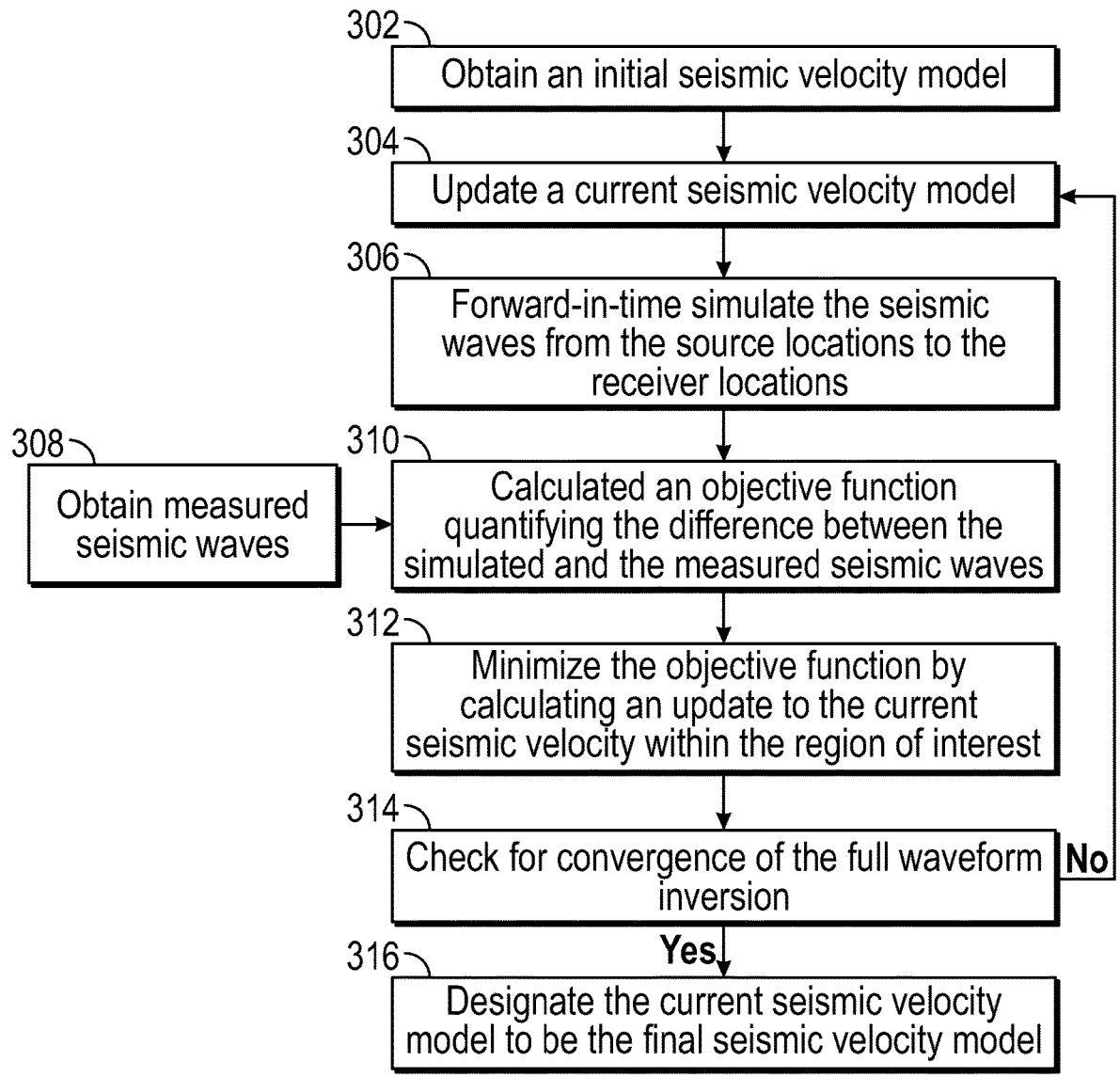
FIG. 3 shows a flowchart illustrating full waveform inversion, in accordance with one or more embodiments.

FIG. 3 shows a flowchart describing an exemplary embodiment of FWI. FWI is a method of inverting measured seismic data to generate a multidimensional model of the seismic velocity model of a region of interest. The multidimensional model may be three dimensional, or two dimensional, or one dimensional, depending upon the application and measurement distribution.

In Block 302, FWI obtains an initial estimate of the seismic velocity model for a region of interest surrounding the seismic source (106) and the seismic receivers (116). The model may vary as a function of spatial position.

In Block 304 the initial seismic velocity model is first assigned to be the current seismic velocity model. Later in the flow, the current seismic velocity model will be updated iteratively as part of the inversion.

In Block 306, FWI uses the elastic wave equation, or a simplified version of the elastic wave equation, such as the acoustic wave equation or Helmholtz wave equation, to model the propagation of seismic waves within the subterranean region of interest (102) and to simulate the seismic waves measured by seismic receivers (116), based at least in part on the current seismic velocity model. In accordance with one or more embodiments, this modeling or seismic wave propagation and simulation of the seismic waves measured by the seismic receivers (116) may be done by the computer system (602).

In Block 308 measured seismic waves are obtained from the seismic survey (100), according to one or more embodiments.

In Block 310, the simulated seismic waves and the measured seismic waves may then be compared and a function, denoted an "objective function", may be calculated quantifying the difference between the simulated and the measured seismic waves. In accordance with one or more embodiments the objective function may be the square of the difference between the measured seismic waves and the simulated seismic waves, summed over time samples, seismic sensors and seismic source excitations.

Alternatively, in accordance with one or more embodiments the objective function may be the square of the difference between the measured seismic waves and the simulated seismic waves, seismic sensors and seismic source excitations at a particular frequency. In particular, the objective function, E(m, ω), may be written as:

$$E(m(x)) = \frac{1}{2}\sum_{i=1}^{n_s}\left(\sum_{j=1}^{n_r}\int_0^{T_{max}}(u_{j,i}(t) - d_{j,i}(t))^2 dt\right) \quad \text{Equation (2)}$$

where m(x) is the subsurface velocity model parameter for location x; ω, is the angular frequency, $n_s$ and $n_r$ are the number of source and receivers, respectively, and * denotes the complex conjugate, and $\tilde{u}_{j,i}$ and $\tilde{d}_{j,i}$ are frequency-domain modeled and recorded wavefields at the j-th receiver due to the i-th source, respectively.

In Block 312, in accordance with one or more embodiments, the objective function may be minimized by calculating an update to current seismic velocity model within the region of interest.

In particular, in accordance with one or more embodiments, the forward scattering portion for the FWI gradient kernel may be used to update the seismic velocity model. This forward scattering portion of the FWI kernel focuses the seismic velocity model update on the contributions of refracted seismic waves (110) in the seismic data set (200). Refracted seismic waves (110) are the early arrivals on seismic traces and as a result, they are not suffer interference from, and provide more stable results from the simulated seismic traces used in the FWI process and a better estimation of the simulated arrival-times of first arrival events. The tomographic kernel, $G_{tomo}$, from the FWI gradient is extracted by using low-angle-cut filtering using cosine function and the kernel in the time domain. $G_{tomo}$ may be expressed as:

$$G_{tomo}(x) = \frac{2}{m^3(x)} \quad \text{Equation (3)}$$

$$\int_0^{T_{max}} \frac{\partial^2 u(x, t; x_s)}{\partial t^2} \cdot q(x, t; x_s) \cdot [1 - \cos\{\theta(x, t; x_s)\}]^4 dt$$

where $x_s$ is the source position and q(x, t; $x_s$) are the backward-propagated waves which may be obtained by propagating the difference between the measured seismic data set (200) and the simulated seismic data set in the reverse-time, θ is the half opening-angle between source and receiver wavefields at a subsurface location, x. θ ranges between 0 to 90 degree. Seismic wave propagation directional vectors may be calculated by the optical flow methodology with the algorithm disclosed by Horn and Schunck, 1981, "Determining optical flow", Artificial Intelligence Vol. 17, pp 185-203. The opening-angle is calculated using the directional vectors as disclosed by Xu et al, 2011 "3D angle gathers from reverse time migration", Geophysics Vol. 76(2), pp S77-S92.

The tomographic kernel, $G_{tomo}$(x), controls the smooth portion of the seismic velocity model update, which in turn controls the change in the predicted arrival-time of the first event.

Block 314, the FWI may be checked for convergence. In accordance with one or more embodiment, the check for convergence may comprise evaluating the objective function and determining if the value of the objective function is below a preselected value, where the preselected value quantifies a satisfactory degree of similarity between the simulated seismic waves and the measured seismic waves. Alternatively, convergence may be determined by the iteration at which the value of the objective function ceases to decrease by more than a preselected amount between the current iteration and the previous iteration.

If the FWI has converged the current seismic velocity model may be designated as the final updated seismic velocity model, in Block 316, and the FWI process terminated. If the FWI has not converged, then the update to current seismic velocity model may be added to the current seismic velocity model to form a new current seismic wave propagation velocity model in Block 304, and Blocks 306, 308, 310, 312 and 314 repeated iteratively.

Figure 4:
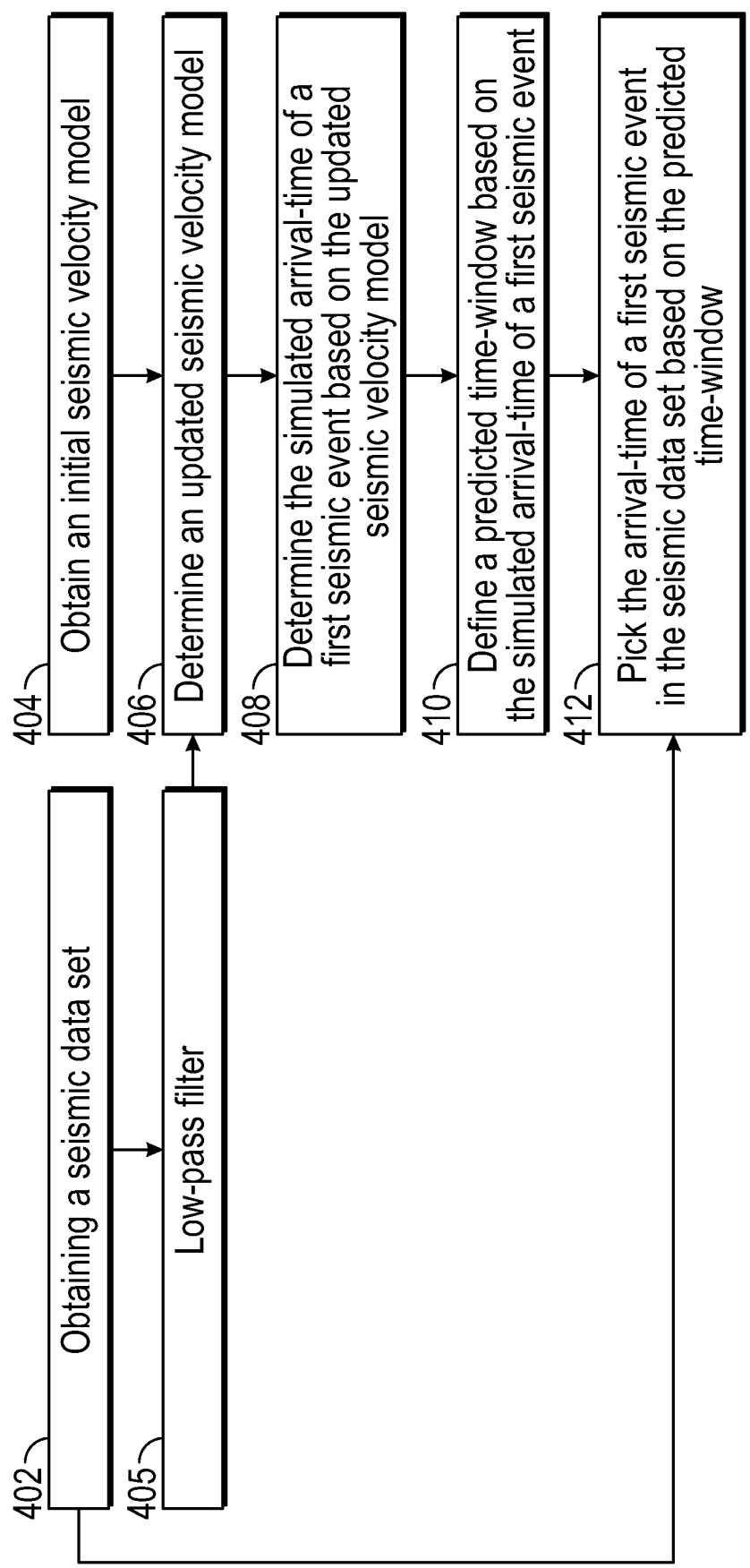
FIG. 4 shows a flowchart, in accordance with one or more embodiments.

FIG. 4 shows a flowchart in accordance with one or more embodiments. In Block 402, a seismic data set (200) is obtained from a seismic survey (100). The seismic survey (100) is acquired over a subterranean region of interest (102). In Block 404, an initial seismic velocity model is obtained. The initial seismic velocity model may describe the speed of seismic wave propagation at points above, within, and below the subterranean region of interest (102). The initial seismic velocity model may be one dimensional (1D), typically containing seismic speeds which only change with depth. Alternatively, the initial seismic velocity model may be two dimensional (2D), typically varying with depth and one horizontal direction, or the initial seismic velocity model may vary in all three dimensions (3D).

In Block 405, the seismic data set (200) obtained in Block 402 may be, according to one or more embodiments, low-pass filtered along the time dimension to produce a low-frequency filtered seismic data set (200). One or more embodiments include a low-pass filtering along the time dimension, in other embodiments, the low-pass filtering may be omitted.

In Block 406, an updated seismic velocity model for the subterranean region of interest (102) may be determined based, at least in part, on the initial seismic velocity model and the seismic data set (200) obtained in Block 402, which may have been low-pass filtered along the time dimension in Block 405. In accordance with one or more embodiment, the updated of the seismic velocity model is determined using FWI as disclosed in FIG. 3. However, many variations of FWI exist and are well known to one of ordinary skill in the art and these variations may be substituted for the exemplary embodiment described.

Furthermore, other methods, such as tomography and iterative Kirchhoff migration, for updating the seismic velocity model may alternatively be substituted for the exemplary embodiment. Those skilled in the art will appreciate that regardless of the variations and/or alternate methods that may be employed, the overall scope of the invention is not substantively changed.

In Block 408, in accordance with one or more embodiments, the simulated arrival-time of the first seismic event based on the updated seismic velocity model may be determined. The determination of a simulated arrival-time of the first seismic event may be done by applying any arrival-time picking algorithm, known to one of ordinary skill in the art, to traces in a simulated seismic data set modeled based, at least in part, on the updated seismic velocity model.

A simulated seismic data set may be modeled for the updated seismic velocity model by solving the elastic wave equation, or a modified version of the elastic wave equation, such as the acoustic wave equation, or Helmholtz wave equation, to model the propagation of seismic waves within the subterranean region of interest (102) and to simulate the seismic waves measured by seismic receivers (116). One of ordinary skill in the art will readily appreciate that there are many methods of solving the elastic wave equation, or a modified version of the elastic wave equation. For example, explicit or implicit finite-difference methods formulated in either the time-domain or the frequency domain may be used to solve the elastic wave equation, or a modified version of the elastic wave equation. Similarly, explicit or implicit finite-element methods formulated in either the time-domain or the frequency domain may be used to solve the elastic wave equation, or a modified version of the elastic wave equation. Alternative methods for simulating the seismic data set include, without limitation, ray tracing through the updated seismic velocity model, Kirchhoff modeling, and WKBJ modeling.

In accordance with one or more the embodiment, the MER method may be used to pick the arrival-time of the first event on a trace in the simulated data set, calculated by any of the methods described in the preceding paragraph to determine the simulated arrival-time of the first seismic event.

Furthermore, in still other embodiments, the simulated arrival-time may be determined by solving the eikonal equation based, at least in part, on the updated velocity model. The eikonal equation may be solved using at a plurality of nodes of a grid on which a discretized version of the velocity model is specified, or seismic rays may be modeled using the eikonal equation and based, at least in part, on a seismic velocity model.

In Block 410, in accordance with one or more embodiments, a predicted arrival time-window may be determined, based at least in part on the simulated arrival-times of the first event. In subsequent blocks, the arrival-time (202) of the first event (204) on a trace in the seismic data set (200), may be constrained to be within the predicted arrival time-window. In accordance with one or more embodiments, the start-time of the predicted arrival time-window may be earlier than the simulated arrival-time of the first event. In accordance with other embodiments, the start-time of the predicted arrival time-window may be at before the simulated arrival-time of the first event. In accordance with one or more embodiments, the end-time of the predicted arrival time-window may be latter than the simulated arrival-time of the first event.

In accordance with one or more embodiments, the duration of the arrival time-window, defined as the difference between the end-time and the start-time may be chosen based upon the dominant frequency of the seismic data set (200). In accordance with one or more embodiments, the duration of the arrival time-window is selected to be large enough to include several cycles of the dominant frequency of the seismic data set (200).

In Block 412, in accordance with one or more embodiments, the arrival-time (202) of the first event (204) on a trace in the seismic data set (200) may be picked based, at least in part, on the seismic data set (200), and on the predicted arrival time-window. One of ordinary skill in the art will readily realize that there are many algorithms that may be used for determining the arrival-time (202) of the first event (204) on a trace in the seismic data set (200) within a predicted arrival time-window, including without limitation, dynamic time warping, and cross-correlation based methods.

In one or more embodiments, a plurality of extrema of the seismic trace within the predicted time-window may be identified. The extrema may all be maxima, or may all be minima of the amplitudes represented by the seismic trace samples. The extremum closest to the simulated arrival-time and earlier in time than the simulated arrival-time may be determined. Herein, this extremum is denoted the "early extremum", $E_1(x, t)$. Furthermore, the extremum closest to the simulated arrival-time and later in time than the simulated arrival-time may be determined. Herein, this extremum is denoted the "late extremum", $E_2(x, t)$. Each extremum is labeled by its spatial index x, and by its time index $t_{E1}(x)$, and $t_{E2}(x)$.

The extrema of each seismic trace in a 1D line of traces from the seismic data set (200), extending away from the vicinity of the seismic source location in one or more directions, may be used as input for the first arriving event "snapping" algorithm shown below. In this algorithm, the space-time distance between the early extrema of a seismic trace and an arrival-time for a plurality of adjacent traces for each of which a arrival-time has already been determined is calculated. Further, the space-time distance between the late extrema of the seismic and an arrival-time for a plurality of adjacent traces for each of which a arrival-time has already been determined is calculated. In accordance with one or more embodiments a minimum space-time distance is determined from the set of space-time distances calculated for the early extrema, and the set of space-time distances calculated for the late extrema, and the arrival-time corresponding to this minimum space-time distance is determined to be the arrival-time of the first arriving event.

---

Algorithm First arriving event "snapping" algorithm

Figure 5A:
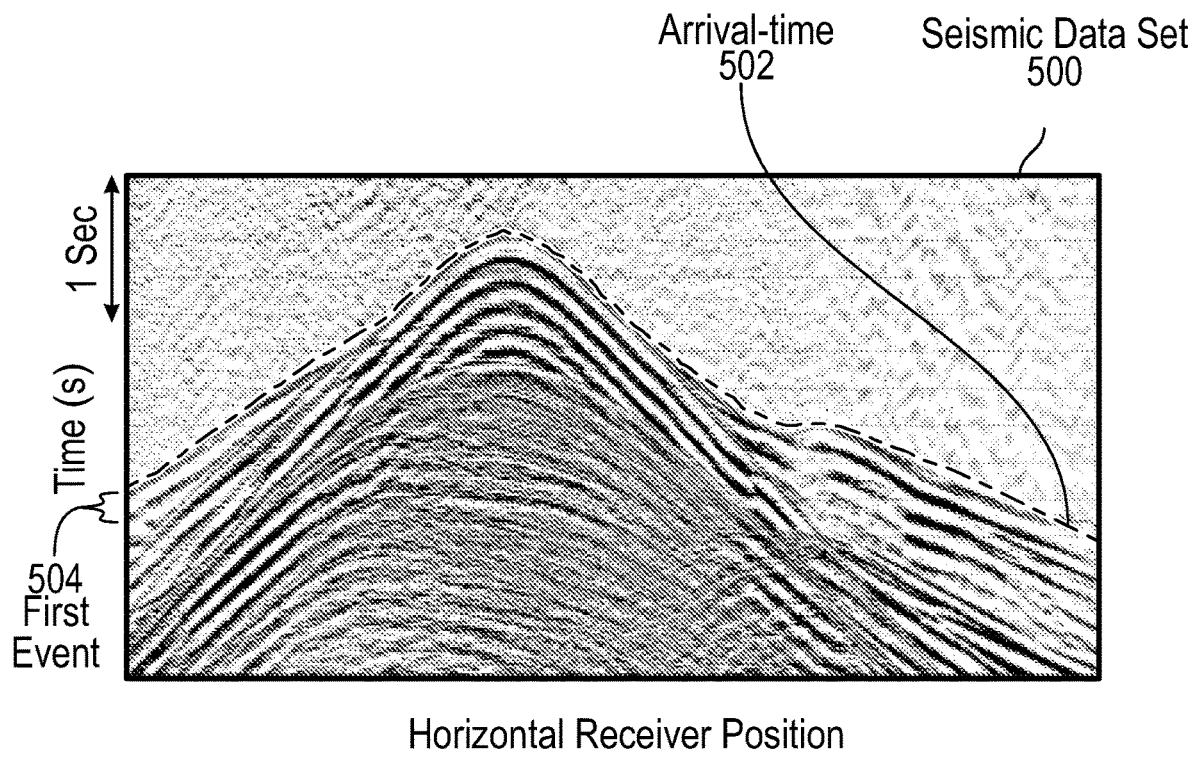
FIG. 5A, 5B show a seismic data set, in accordance with one or more embodiments.
Figure 5B:
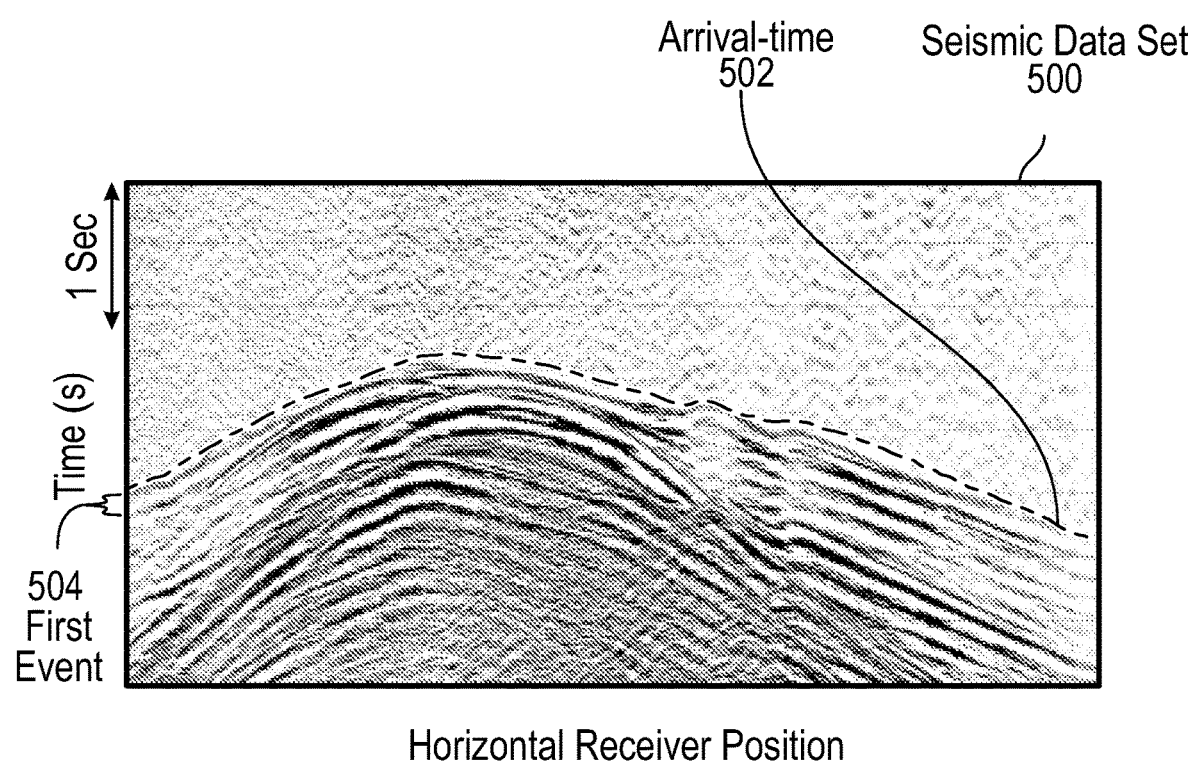

Input: $t_{E1}(x)$, and $t_{E2}(x)$.
Output: f'(x) - revised arrival-time of first events
1: $x_0 \leftarrow$ the spatial index of the data d'(x, t) closest to the seismic source
2: $t_0 \leftarrow$ the time index of the predicted arrival-time for the trace with spatial index $x_0$
3: n ← the number of traces
4: nt ← the number of time samplings
5: $b_x \leftarrow 1/n$
6: $b_t \leftarrow 1/nt$
7:    for x = $x_0$ to x = $x_n$ do
8:        for t = $t_{E1}$ and $t_{E2}$ do
9:            if M(x, t) ≠ 0 then
10:                for l = 0 to l = 5 do
11:                    dist(l, t) = $[\{(x - l) - x_0\} \cdot b_x]^2 + [\{(t - t_0)\} \cdot b_t]^2$
12:                end for
13:            end if
14:        end for
15:        (l', t') = arg min dist(l, t)
16:        $x_0 \leftarrow$ x - l'
17:        $t_0 \leftarrow$ t'
18:        f '(x) ← $t_0$
19: end for FIG. 5 shows exemplary results of applying an embodiment of the workflow depicted in FIG. 4 to the seismic data set shown in FIG. 2. FIG. 5A and FIG. 5B show two-dimensional (2D) slices through a seismic data set (500). In both FIG. 5A and FIG. 5B the abscissa (horizontal axis) is one horizontal receiver position coordinate, e.g. $x_r$, and the ordinate (vertical axis) is time, t. FIG. 5A shows a 2D slice which passes close to the source position ($x_s$, $y_s$), while FIG. 5B shows a 2D slice which passes further from the source position ($x_s$, $y_s$). The picked arrival-time of the first arriving event (504) previously shown in FIGS. 2A and 2B is shown by the dashed line (502) for each seismic trace. The picked arrival-time of the first arriving event (504) resulting from one or more embodiments depicted by the flowchart in FIG. 4 is shown by the solid line (503).

Figure 6:
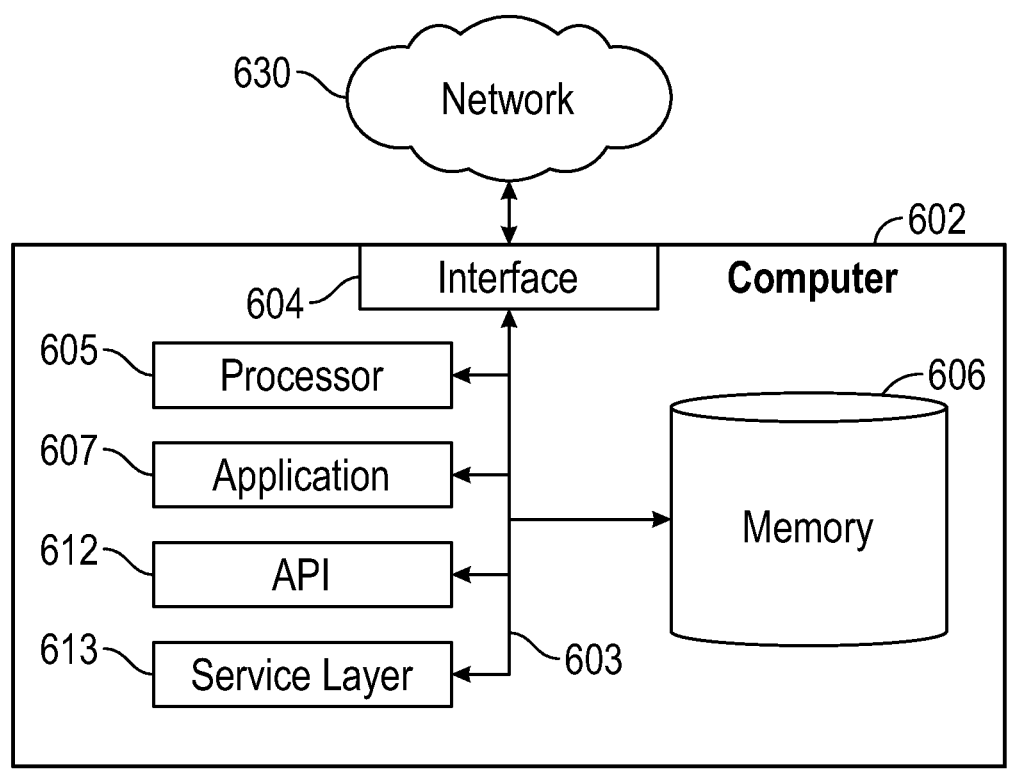
FIG. 6 shows a computer system, in accordance with one or more embodiments.

Embodiments may be implemented on a computer system. FIG. 6 is a block diagram of a computer system (602) used to provide computational functionalities associated with described algorithms, methods, functions, processes, flows, and procedures as described in the instant disclosure, according to an implementation. The illustrated computer (602) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (602) may include a computer that includes an input device, such as a keypad, keyboard, touch screen, or other device that can accept user information, and an output device that conveys information associated with the operation of the computer (602), including digital data, visual, or audio information (or a combination of information), or a GUI.

The computer (602) can serve in a role as a client, network component, a server, a database or other persistency, or any other component (or a combination of roles) of a computer system for performing the subject matter described in the instant disclosure. The illustrated computer (602) is communicably coupled with a network (630). In some implementations, one or more components of the computer (602) may be configured to operate within environments, including cloud-computing-based, local, global, or other environment (or a combination of environments).

At a high level, the computer (602) is an electronic computing device operable to receive, transmit, process, store, or manage data and information associated with the described subject matter. According to some implementations, the computer (602) may also include or be communicably coupled with an application server, e-mail server, web server, caching server, streaming data server, business intelligence (BI) server, or other server (or a combination of servers).

The computer (602) can receive requests over network (630) from a client application (for example, executing on another computer (602)) and responding to the received requests by processing the said requests in an appropriate software application. In addition, requests may also be sent to the computer (602) from internal users (for example, from a command console or by other appropriate access method), external or third-parties, other automated applications, as well as any other appropriate entities, individuals, systems, or computers.

Each of the components of the computer (602) can communicate using a system bus (603). In some implementations, any or all of the components of the computer (602), both hardware or software (or a combination of hardware and software), may interface with each other or the interface (604) (or a combination of both) over the system bus (603) using an application programming interface (API) (612) or a service layer (613) (or a combination of the API (612) and service layer (613). The API (612) may include specifications for routines, data structures, and object classes. The API (612) may be either computer-language independent or dependent and refer to a complete interface, a single function, or even a set of APIs. The service layer (613) provides software services to the computer (602) or other components (whether or not illustrated) that are communicably coupled to the computer (602). The functionality of the computer (602) may be accessible for all service consumers using this service layer. Software services, such as those provided by the service layer (613), provide reusable, defined business functionalities through a defined interface. For example, the interface may be software written in JAVA, C++, or other suitable language providing data in extensible markup language (XML) format or other suitable format. While illustrated as an integrated component of the computer (602), alternative implementations may illustrate the API (612) or the service layer (613) as stand-alone components in relation to other components of the computer (602) or other components (whether or not illustrated) that are communicably coupled to the computer (602). Moreover, any or all parts of the API (612) or the service layer (613) may be implemented as child or sub-modules of another software module, enterprise application, or hardware module without departing from the scope of this disclosure.

The computer (602) includes an interface (604). Although illustrated as a single interface (604) in FIG. 6, two or more interfaces (604) may be used according to particular needs, desires, or particular implementations of the computer (602). The interface (604) is used by the computer (602) for communicating with other systems in a distributed environment that are connected to the network (630). Generally, the interface (604 includes logic encoded in software or hardware (or a combination of software and hardware) and operable to communicate with the network (630). More specifically, the interface (604) may include software supporting one or more communication protocols associated with communications such that the network (630) or interface's hardware is operable to communicate physical signals within and outside of the illustrated computer (602).

The computer (602) includes at least one computer processor (605). Although illustrated as a single computer processor (605) in FIG. 6, two or more processors may be used according to particular needs, desires, or particular implementations of the computer (602). Generally, the computer processor (605) executes instructions and manipulates data to perform the operations of the computer (602) and any algorithms, methods, functions, processes, flows, and procedures as described in the instant disclosure.

The computer (602) also includes a memory (606) that holds data for the computer (602) or other components (or a combination of both) that can be connected to the network (630). For example, memory (606) can be a database storing data consistent with this disclosure. Although illustrated as a single memory (606) in FIG. 6, two or more memories may be used according to particular needs, desires, or particular implementations of the computer (602) and the described functionality. While memory (606) is illustrated as an integral component of the computer (602), in alternative implementations, memory (606) can be external to the computer (602).

The application (607) is an algorithmic software engine providing functionality according to particular needs, desires, or particular implementations of the computer (602), particularly with respect to functionality described in this disclosure. For example, application (607) can serve as one or more components, modules, applications, etc. Further, although illustrated as a single application (607), the application (607) may be implemented as multiple applications (607) on the computer (602). In addition, although illustrated as integral to the computer (602), in alternative implementations, the application (607) can be external to the computer (602).

There may be any number of computers (602) associated with, or external to, a computer system containing computer (602), wherein each computer (602) communicates over network (630). Further, the term "client," "user," and other appropriate terminology may be used interchangeably as appropriate without departing from the scope of this disclosure. Moreover, this disclosure contemplates that many users may use one computer (602), or that one user may use multiple computers (602).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method of determining an arrival-time of a first seismic event in a seismic data set, comprising:
    obtaining, by a computer processor, the seismic data set;
    obtaining, by a computer processor, an initial seismic velocity model;
    determining, by a computer processor, an updated seismic velocity model based, at least in part, on the seismic data set;
    determining, by a computer processor, a simulated arrival-time of the first seismic event based, at least in part, on the updated seismic velocity model;
    defining, by a computer processor, a predicted time-window based, at least in part, on the simulated arrival-time of the first seismic event; and
    picking, by a computer processor, the arrival-time of the first seismic event in the seismic data set based, at least in part, on the predicted time-window.

2. A method of claim 1,
    wherein determining, by a computer processor, an updated seismic velocity model based, at least in part, the seismic data set, further comprises:
    applying, by a computer processor, a filter to the seismic data set.

3. A method of claim 2,
    wherein the filter is a low-pass filter applied to a time dimension of the seismic data set.

4. A method of claim 1,
    wherein determining, by a computer processor, an updated seismic velocity model based, at least in part, the seismic data set, further comprises:
    determining, by a computer processor, using a method selected from the group consisting of, a full waveform inversion, and a tomographic inversion.

5. The method of claim 1,
    wherein determining, by a computer processor, the simulated arrival-time of the first seismic event based, at least in part, on the updated seismic velocity model, further comprises:
    simulating, a simulated seismic data set based, at least in part, on the updated seismic velocity model and picking the simulated arrival-time of the first seismic event based, at least in part, on the simulated seismic data set.

6. The method of claim 5,
    wherein picking the simulated arrival-time of the first seismic event, further comprises:
    applying, the Modified Energy Ratio method to the simulated seismic data set.

7. The method of claim 1,
    wherein determining, by a computer processor, the arrival-time of the first seismic event based, at least in part, on the updated seismic velocity model, further comprises:
    calculating, the simulated arrival-time of the first seismic event by solving the eikonal equation for the updated seismic velocity model.

8. The method of claim 1,
    wherein defining, by a computer processor, a predicted time-window based, at least in part, on the simulated arrival-time of the first seismic event, further comprises:
    defining, a start-time which is earlier than a simulated arrival-time of the first seismic event, and an end-time which is later than a simulated arrival-time of the first seismic event.

9. The method of claim 1,
    wherein picking, by a computer processor, the arrival-time of the first seismic event in the seismic data set based, at least in part, on the predicted time-window, further comprises:
    applying, the first break tracking algorithm to the seismic data set.

10. The method of claim 1,
    wherein picking, by a computer processor, the arrival-time of the first seismic event in the seismic data set based, at least in part, on the predicted time-window, further comprises:
    muting, the seismic data outside the predicted time-window, and using the Modified Energy Ratio method to pick the arrival-time of the first seismic event based, at least in part on the seismic data.

11. A non-transitory computer readable medium storing instructions executable by a computer processor, the instructions comprising functionality for:
    obtaining, a seismic data set;
    obtaining, an initial seismic velocity model;
    determining, an updated seismic velocity model based, at least in part, on the seismic data set;
    determining, a simulated arrival-time of the first seismic event based, at least in part, on the updated seismic velocity model;
    defining, a predicted time-window based, at least in part, on the simulated arrival-time of the first seismic event; and
    picking, the arrival-time of the first seismic event in the seismic data set based, at least in part, on the predicted time-window.

12. The non-transitory computer readable medium of claim 11,
wherein determining, an updated seismic velocity model based, at least in part, the seismic data set, further comprises:
applying, a filter to the seismic data set.

13. The non-transitory computer readable medium of claim 12, wherein the filter is a low-pass filter applied to a time dimension of the seismic data set.

14. The non-transitory computer readable medium of claim 11,
determining, an updated seismic velocity model based, at least in part, the seismic data set, further comprises:
determining, using a method selected from the group consisting of, a full waveform inversion, and a tomographic inversion.

15. The non-transitory computer readable medium of claim 11,
wherein determining, the simulated arrival-time of the first seismic event based, at least in part, on the updated seismic velocity model, further comprises:
simulating, a simulated seismic data set based, at least in part, on the updated seismic velocity model and picking the simulated arrival-time of the first seismic event based, at least in part, on the simulated seismic data set.

16. The non-transitory computer readable medium of claim 15,
wherein picking the simulated arrival-time of the first seismic event, further comprises:
applying, the Modified Energy Ratio method to the simulated seismic data set.

17. The non-transitory computer readable medium of claim 11,
wherein determining, the simulated arrival-time of the first seismic event based, at least in part, on the updated seismic velocity model, further comprises:
calculating, the simulated arrival-time of the first seismic event by solving the eikonal equation for the updated seismic velocity model.

18. The non-transitory computer readable medium of claim 11,
wherein defining, a predicted time-window based, at least in part, on the simulated arrival-time of the first seismic event, further comprises:
defining, a start-time which is earlier than a simulated arrival-time of the first seismic event, and an end-time which is later than a simulated arrival-time of the first seismic event.

19. The non-transitory computer readable medium of claim 11,
wherein picking, the arrival-time of the first seismic event in the seismic data set based, at least in part, on the predicted time-window, further comprises:
applying, a first break tracking algorithm to the seismic data set.

20. The non-transitory computer readable medium of claim 11,
wherein picking, the arrival-time of the first seismic event in the seismic data set based, at least in part, on the predicted time-window, further comprises:
muting, the seismic data outside the predicted time-window, and using the Modified Energy Ratio method to pick the arrival-time of the first seismic event based, at least in part on the seismic data.

* * * * *